United States Patent [19]

Ohmori

[11] Patent Number: 4,705,373
[45] Date of Patent: Nov. 10, 1987

[54] CHARGE COMPLETION CONFIRMING DEVICE FOR FLASH LIGHT DEVICES

[75] Inventor: Kouichi Ohmori, Kanagawa, Japan

[73] Assignee: Canon Kabushiki Kaisha, Tokyo, Japan

[21] Appl. No.: 912,965

[22] Filed: Sep. 29, 1986

[30] Foreign Application Priority Data

Oct. 1, 1985 [JP] Japan .................................. 60-216229

[51] Int. Cl.⁴ ............................................. G03B 15/05
[52] U.S. Cl. .................................. 354/127.11; 354/132
[58] Field of Search ..................... 354/418, 127.11, 132

[56] References Cited

U.S. PATENT DOCUMENTS 4,643,551 2/1987 Ohmori .............................. 354/132

Primary Examiner—Michael L. Gellner
Attorney, Agent, or Firm—Fitzpatrick, Cella, Harper & Scinto

[57] ABSTRACT

The present invention relates to a device for confirming whether all of flash light devices to be used are in the fully charged state or not in case a plural number of flash light devices are used for flash photographing. According to the present invention, in case a plural number of flash light devices are used for flash photographing, when some of the flash light devices are not used, only the flash light devices to be used are detected in such a manner that only the charge state of the detected flash light devices to be used is detected except the flash light devices not to be used.

8 Claims, 2 Drawing Figures

CHARGE COMPLETION CONFIRMING DEVICE FOR FLASH LIGHT DEVICES

BACKGROUND OF THE INVENTION

1. Field of the Invention

The present invention relates to an improvement in a state confirming device for flash light devices to be used for flash photography in case a plural number of flash light devices are connected to a camera.

2. Description of the Related Art

It is necessary to investigate whether all flash light devices connected to a camera are in the state capable of discharging flash light or not before taking a photograph in case a plural number of flash light devices are used. Until now, a flash light dischargeability indicator is detected for each flash light device or for only one of the flash light devices so as to judge that all the other flash light devices are also in the state capable of discharging flash light (for example, Japanese Laid-Open Patent Application No. Sho 59-64821). However, in the former case, it is necessary to check all the flash light dischargeability indicators, which is a tiresome work, while in the latter case, there is a damage that the flash light device incapable of discharging flash light would exist (because the charge completion time is not equal for each device in case the flash light discharge amount of the connected flash light device is different).

Further, there exists a device by means of which a charge completion signal from all of the flash light devices is detected in order to investigate the state of all the devices in such a manner that flash light is allowed to be discharged when the charge completion signals from all of the flash light devices have been inputted. However, it is impossible to carry out the flash light photographing unless all the flash light devices are used (connected), which is inconvenient. Namely, in case there exist devices which are not used (connected), the charge completion signal is not inputted to the terminals to which the flash light devices are to be connected with the result that all the flash light devices are judged not to be in the flash light dischargeable state.

SUMMARY OF THE INVENTION

It is accordingly an object of the present invention to provide a charge state confirming device which detects the connected state of each flash light device in case a plural number of flash light devices are used at the same time and delivers a signal for the charge completion detection when the charge completion signal from all of the flash light devices in the connected state has been detected in order to detect whether all of the flash light devices to be used have been charged.

It is another object of the present invention to provide a charge state confirming device which detects the charge completion signal only from the flash light devices to be used when certain flash light devices are not connected in case a plural number of flash light devices are used at the same time and detects whether all the flash light devices to be used excepting those not to be used have been charged or not.

Further objects and features of the present invention will become apparent from the explanation to be made below according to the accompanying drawings of the embodiment of the present invention.

DETAILED DESCRIPTION OF THE PREFERRED EMBODIMENT

Below, the present invention will be explained in detail according to the accompanying drawings of the embodiment thereof.

Figure 1:
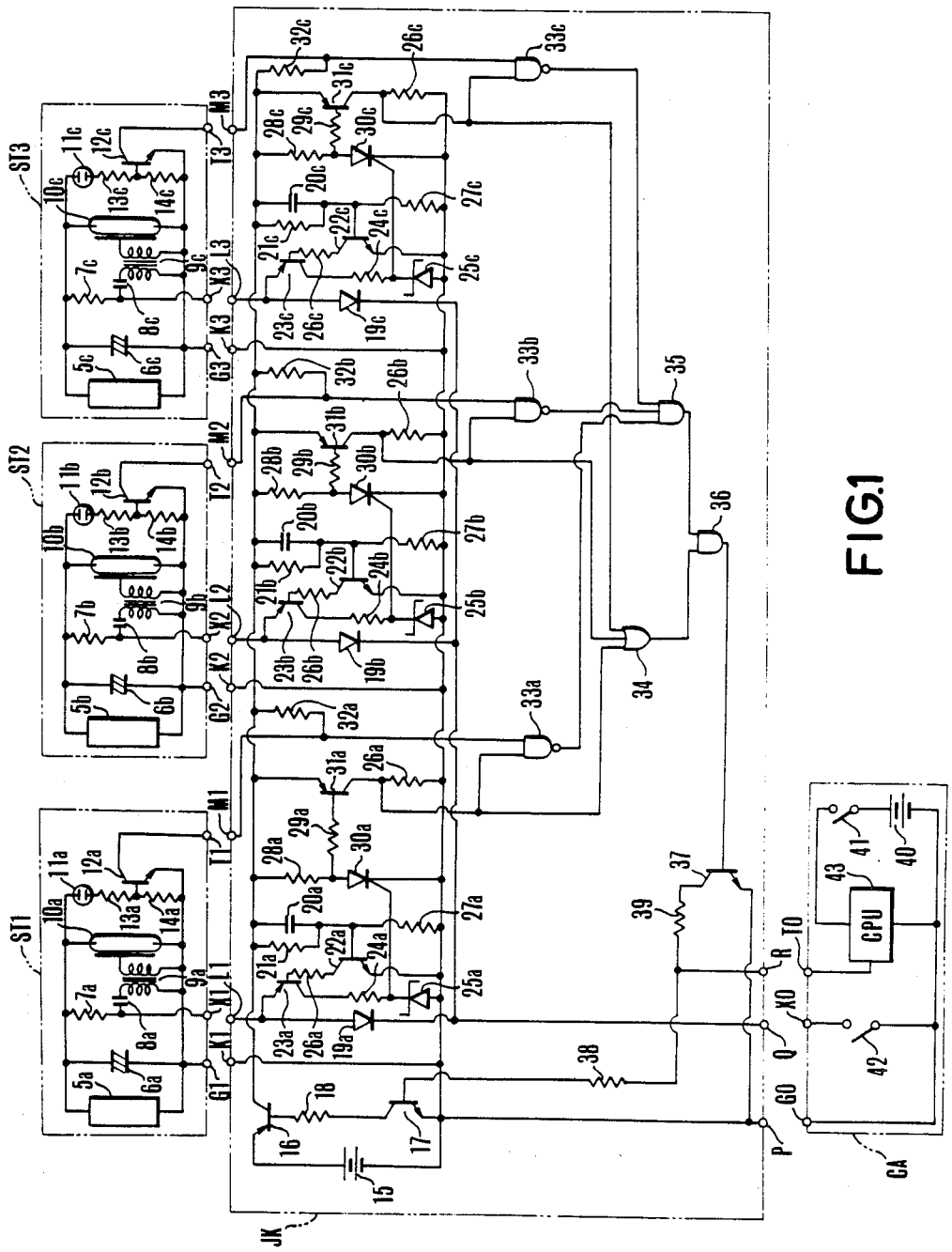
FIG. 1 shows a circuit diagram of an embodiment of the present invention.
Figure 2:
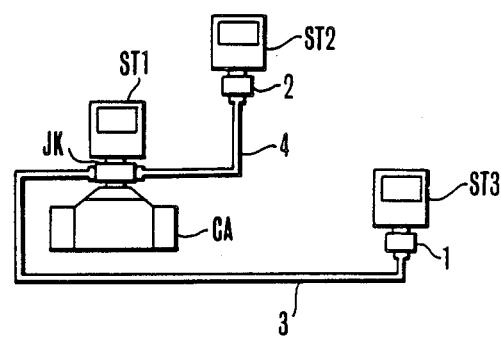
FIG. 2 shows the connection of each device.

FIGS. 1 and 2 show an embodiment in which three flash light devices are connected to a camera. In FIG. 2, CA is the camera. ST1, ST2 and ST3 are flash light devices. JK is a state confirming device for confirming whether all of the flash light devices ST1-ST3 are in the state capable of emitting flash light or not. 1 and 2 are adapters for transmitting signals while holding the above flash light devices ST1-ST3. 3 and 4 are synchronizing cords.

FIG. 1 is a circuit diagram of each device shown in FIG. 2. $5a$–$5c$ are power source/D.C. voltage step up circuits. $6a$–$6c$ are flash light capacitors. $7a$–$7c$ are resistors. $8a$–$8c$ are trigger capacitors. $9a$–$9c$ are trigger transformers. $10a$–$10c$ are flash light discharge tubes. $11a$–$11c$ are neon tubes which light up when the above flash light capacitors $6a$–$6c$ have been charged. $12a$–$12c$ are transistors which are brought into the conductive state when the above neon tubes $11a$–$11c$ light up. $13a$–$13c$ and $14a$–$14c$ are resistors. G1–G3 are ground terminals. X1–X3 are synchronization terminals. T1–T3 are charge state signal output terminals. In this way, the above flash light devices ST1-ST3 are composed of the power source/D.C. voltage step up circuits $5a$–$5c$ to the resistors $14a$–$14c$.

15 is a power source battery. 16 and 17 are transistors. 18 is a resistor. $19a$–$19c$ are diodes. $20a$–$20c$ are capacitors which constitute time constant circuits with resistors $21a$–$21c$ so as to keep transistors $22a$–$22c$ in the conductive state for a certain determined time after the current has been supplied. $23a$–$23c$ are transistors designed in such a manner that when they are brought into the conductive state the voltage produced at the connecting points of the resistors $7a$–$7c$ with the trigger capacitors $8a$–$8c$ appear at the cathodes of Zener diodes $25a$–$25c$ via resistors $24a$–$24c$. $26a$–$26c$, $27a$–$27c$, $28a$–$28c$ and $29a$–$29c$ are resistors and $30a$–$30c$ are thyristors which are switched on when the voltage appears at the cathodes of the above Zener diodes $25a$–$25c$. $31a$–$31c$ are transistors which are switched on when the above thyristors $30a$–$30c$ are switched on. $32a$–$32c$ are resistors. $33a$–$33c$ are NAND gates into one input terminal of each of which the output of the above transistors $12a$–$12c$ is inputted and the other input terminal of each of which the output of the above transistors $31a$–$31c$ is inputted. 34 is a 3-input OR gate into which each output of the above transistors $31a$–$31c$ is inputted. 35 is a 3-input AND gate into which each output of the above NAND gate $33a$–$33c$ is inputted. 36 is an AND gate. 37 is a transistor which is switched on when the high level signal from the above AND gate 36 is inputted therein. 38 and 39 are resistors. K1–K3, L1–L3 and M1–M3 are respectively terminals to be connected to ground terminals G1–G3 of the above flash light devices ST1-ST3, synchronization terminals X1–X3 and charge state signal output terminals T1–T3. P, Q and R are terminals to be connected to a ground terminal G0 of the camera CA to be explained later, a synchronization terminal X0 and a charge state signal input terminal T0. In this way, the state confirming device JK is composed of the power source battery 15 to the resistor 39.

40 is a power source battery at the camera side. 41 is a switch to be closed in synchronization with the shutter release. 42 is a synchronization switch. 43 is a CPU for carrying out various control which, when the current amount flowing into the synchronization terminal X increases and the state confirming device JK judges that all of the flash light devices then connected are in the state ready for discharging flash light, allows the flash light discharging. G0 is a ground terminal. X0 is a synchronization terminal. T0 is a charge state signal input terminal. Thus, the above camera CA is provided with the power source battery 40 to the CPU 43.

Below, the operation will be explained. Firstly, the case that all of the three flash light device ST1–ST3 are connected to the camera CA as is shown in FIG. 2 will be explained.

When the flash light devices ST1–ST3 are brought into the operative state, namely when the power source/D.C. voltage step up circuits 5a–5c are operated so as to charge the flash light capacitors 6a–6c and the trigger capacitors 8a–8c, a voltage is produced at the synchronization terminals X1–X3. When in this state the camera CA is released, the switch 41 is closed and then the CPU 43 operates to produce a voltage at the terminal T0. Then, the transistors 16 and 17 in the state confirming device JK are switched on so as to deliver a current to each circuit in the above-stated confirming device JK. Then, the transistors 22a–22c become conductive by the time constant determined by the capacitors 20a–20c and the resistors 21a–21c, whereby the transistors 23a–23c also become conductive in such a manner that the voltage produced at the above synchronization terminals X1–X3 appears at the cathodes of the Zener diodes 25a–25c via the transistors 23a–23c. When the voltage is applied on the gates of the thyristors 30a–30cas to switch on the thyristors 30a–30c, the transistors 31a–31c are switched on, whereby to one input terminal of each of the NAND gates 33a–33c and one input terminal of the OR gate 34 a high level signal showing the presence of the flash light device is inputted. Hereby after the lapse of a certain determined time, namely, when the capacitors 20a–20c have been charged, the above transistors 22a–22c and 23a–23c are switched off, whereby because the thyristors 30a–30c remain switched on due to the self-holding current, the transistors 31a–31c also remain switched on in such a manner that a high level signal remains inputted to one input terminal of each of the above NAND gates 33a–33c and one input terminal of the OR gate 34.

When all of the flash light devices ST1–ST3 become ready for discharging flash light, namely, when the neon tubes 11a–11c light up, the transistors 12a–12c are switched on, so that a low level signal is produced at the charge state signal input terminals T1–T3 in such a manner that a low level signal is inputted into the other input terminal of the above NAND gates 33a–33c. Consequently, a high level signal is produced by the above NAND gates 33a–33c and delivered to one input terminal of the AND gate 36 via the AND gate 35. Then, to the other input terminal of the AND gate 36, a high leve signal remains inputted via the OR gate 34, so that from the AND gate 36 a high level signal indicating that all of the flash light devices now connected are in the state ready for discharging flash light is delivered. Thus, the transistor 37 is switched on, and a current flows to the transistor 37 via the resistor 39, which is detected by the CPU 43 in the camera CA via the terminal R. When it is detected that all of the flash light devices are in the state ready for discharging flash light, the CPU 43 lets the photographer know acoustically or optically that all of the flash light devices are in the state ready for discharging flash light, setting at the same time the shutter time, for example, at 1/60 sec.

In case some of the flash light devices ST1–ST3 then connected is not in the state capable of discharging flash light, some of the terminals M1–M3 delivers a high level signal, while some of the NAND gates 33a–33c delivers a low level signal, so that the output of the AND gate 36 does not become at a high level and thus the transistor 37 is not switched on. Thus, in such a case, the discharge of flash light is not allowed by the CPU 43.

When the release operation of the camera CA is further advanced, the synchronization switch 42 is switched on and the trigger capacitors 8a–8c and the trigger transformers 9a–9c operate in a conventional way so as to apply the trigger signals to the flash light discharge tubes 10a–10c, which discharge flash light.

Next, the case that, for example, the flash light device ST3 is not used, while only the devices ST1 and ST2 are used, being connected to the camera CA via the state confirming device JK will be explained. Because in this case no voltage is produced at the synchronization terminal X3, no voltage is produced at the cathode of the Zener diode 25c, even if the transistors 22c, and 23c are in the conductive state, so that the thyristor 30c is not switched on. Thus, the transistor 31c also is not switched on and a low level signal is inputted into one input terminal of the NAND gate 33c. Because at this time to the other input terminal of the NAND gate 33c a high level signal is inputted, the output of the NAND gate 33c becomes a high level signal. When the flash light devices ST1 and ST2 then connected are in the state capable of discharging flash light, the output of the AND gate 36 is at a high level in the same way as in case all of the three flash light devices are connected, so that the transistor 37 is switched on. Thus, it is detected by the CPU 43 that the flash light devices then connected are in the state capable of discharging flash light, and the flash light devices are allowed to discharge flash light.

Thirdly, the case that none of the flash light devices ST1–ST3 is connected to the camera CA will be explained. Because in this case the transistors 31a–31c are switched off, the outputs of the NAND gates 33a–33c and the AND gate 35 are high level signals. However, because the output of the OR gate 34 is a low level signal, the AND gate 36 delivers a low level signal indicating that it is impossible to discharge charge flash light. Thus, in such a case, the transistor 37 is not switched on, so that the flash light devices are not allowed by the CPU 43 to discharge flash light.

According to the present embodiment, the presence of the connected flash light devices is confirmed by the voltage state at the synchronization terminals X1–X3, and then the charge state of the flash light devices is confirmed, so that it is possible to confirm correctly and easily the discharge ready state of all of the flash light devices. Further, because the presence of the flash light devices can be confirmed by the voltage state of the synchronization terminals X1–X3, it is not necessary to provide exclusive terminals newly, enabling the application of the existing terminals.

Furthermore, in order to confirm the presence of the flash light devices the voltage state of the synchronization terminals X1–X3 is investigated only for a certain determined time, so that non-flash light discharge due to the trigger voltage drop is avoided. Namely, in case the voltage at the synchronization terminals X1–X3 is detected for a long time, the power source voltage is consumed in the resistors 7a–7c and 24a–24c to cause a trigger voltage to drop.

In the case of the present invention, the terminals L1–L3 correspond to the first terminals of the present invention, the terminals M1–M3 correspond to the second terminals, the terminal Q corresponds to the third terminal the terminal R corresponds to the fourth terminal, the capacitors 20a–20c to the transistors 31a–31c correspond to the judging means, and the NAND gates 33a–33c to the AND gate 36 correspond to the state confirming means respectively.

As explained above, according to the present invention, judging means for judging connected flash light devices is provided, so as to confirm whether all of the flash light devices judged by the judging means are in the state capable of discharging flash light. Therefore, it is possible to detect correctly and easily the discharge ready state of the connected flash light devices.

What is claimed is:

1. A state confirming device for detecting charge completion states of a plural number of flash light devices each having a capacitor for storing a flash light energy, charge state detecting for detecting a charge state of the capacitor to deliver a charge completion signal when the charge state is at a level higher than a certain determined value, and mount signal forming means for delivering a mount signal when the flash light device is mounted, comprising:
   (a) first detecting means for detecting the charge completion signal and the mount signal from each of the flash light devices for each of the flash light devices to produce an output when the mount signal is not detected or when the charge completion signal is detected, said first detecting means being provided for each of the flash light devices;
   (b) second detecting means for detecting the mount signal from each of the flash light devices to produce an output when at least one of the flash light devices delivers the mount signal; and
   (c) third detecting means for producing a signal indicating that all of the flash light devices mounted have been charged when all of the first detecting means are producing outputs while the second detecting means is producing an output.

2. A device according to claim 1, wherein the mount signal forming means detects an operation state of a power source circuit of the flash light device to produce the mount signal when the power source circuit is in an operation state.

3. A device according to claim 2, wherein the power source circuit operates to deliver an electrical signal as the mount signal via a synchronization contact.

4. A state confirming device for detecting charge completion states of a plural number of flash light devices, each having a capacitor for storing a flash light energy, charge state detecting means for detecting a charge state of the capacitor to deliver a charge completion signal when the charge state is at a level higher than a certain determined value, and mount signal forming means for delivering a mount signal when the flash light is mounted, comprising:
   (a) a detecting circuit for detecting the charge completion signal and the mount signal from each of the flash light devices to produce a signal indicating the charge completion states when all of the charge completion signals from the flash light devices delivering the mount signal have been detected.

5. A device according to claim 4, wherein the mount signal forming means detects an operation state of a power source circuit of the flash light device to produce the mount signal when the power source circuit is in an operative state.

6. A device according to claim 5, wherein the power source circuit operates to deliver an electrical signal as the mount signal via a synchronization contact.

7. A state confirming device for detecting charge completion states of a plural number of flash light devices, each having a capacitor for storing a flash light energy and charge state detecting means for detecting a charge state of the capacitor to produce a charge completion signal when the charge state is at a level higher than a certain determined value, comprising:
   (a) connecting parts to be connected to each of the flash light devices; and
   (b) a detecting circuit for producing a signal indicating the charge completion when all of the charge completion signals from the flash light devices connected to the connecting parts are detected.

8. A device according to claim 7, wherein the connecting parts are provided for each of the flash light devices, and wherein the detecting circuit includes a second detecting circuit for detecting the connecting parts connected to the flash light devices and a third detecting circuit for detecting all of the charge completion signal inputted via the connecting parts detected by the second detecting circuit.

* * * * *

UNITED STATES PATENT AND TRADEMARK OFFICE
CERTIFICATE OF CORRECTION

PATENT NO. : 4,705,373　　　　　　　　　Page 1 of 2
DATED : November 10, 1987
INVENTOR(S) : KOUICHI OHMORI It is certified that error appears in the above-identified patent and that said Letters Patent is hereby corrected as shown below:

COLUMN 1

Line 25, "damage" should read --danger--.

COLUMN 2

Line 46, "25a25c" should read --25a-25c--.
Line 54, "and the" should read --and into the--.
Line 59, "gate" (first occurrence) should read --gates--.

COLUMN 3

Line 7, "control" should read --controls--.
Line 9, "X" should read --X0--.
Line 17, "device" should read --devices--.
Line 39, "30a-30cas" should read --30a-30c so as--.
Line 63, "leve" should read --level--.

COLUMN 4

Line 29, "22c," should read --22c--.
Line 54, "charge" should be deleted.

COLUMN 5

Line 29, "vices each" should read --vices, each--.
Line 30, "detecting for" should read --detecting means for--

UNITED STATES PATENT AND TRADEMARK OFFICE
CERTIFICATE OF CORRECTION

PATENT NO. : 4,705,373

DATED : November 10, 1987

INVENTOR(S) : KOUICHI OHMORI

It is certified that error appears in the above-identified patent and that said Letters Patent is hereby corrected as shown below:

COLUMN 6

Line 16, "(a)" should be deleted.
Line 51, "signal" should read --signals--.

Signed and Sealed this

Twenty-sixth Day of April, 1988

Attest:

DONALD J. QUIGG

Attesting Officer

Commissioner of Patents and Trademarks

Notice of Adverse Decisions in Interference

In Interference No. 102,381, involving Patent No. 4,705,373, K. Ohmori, CHARGE COMPLETION CONFIRMING DEVICE FOR FLASH LIGHT DEVICES, final judgement adverse to the patentee was rendered July 25, 1990, as to claims 4, 5, 7 and 8.

[*Official Gazette October 23, 1990*]